United States Patent
Chockalingam et al.

(10) Patent No.: US 10,884,874 B1
(45) Date of Patent: Jan. 5, 2021

(54) FEDERATED RESTORE OF AVAILABILITY GROUP DATABASE REPLICAS

(71) Applicant: EMC IP Holding Company LLC, Hopkinton, MA (US)

(72) Inventors: Elango Chockalingam, Bangalore (IN); Jigar Bhanushali, Valsad (IN); Sunder Ramesh Andra, Bangalore (IN); Amarendra Behera, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 181 days.

(21) Appl. No.: 15/496,188

(22) Filed: Apr. 25, 2017

(51) Int. Cl.
*G06F 11/14* (2006.01)
*G06F 16/27* (2019.01)

(52) U.S. Cl.
CPC .......... *G06F 11/1469* (2013.01); *G06F 16/27* (2019.01); *G06F 2201/80* (2013.01)

(58) Field of Classification Search
CPC .......... G06F 17/30575; G06F 11/2094; G06F 11/1451; G06F 11/1469; G06F 11/1458; G06F 2201/80; G06F 11/1471; G06F 11/2097; G06F 2201/84; G06F 16/2365; G06F 16/2358; G06F 16/2379; G06F 11/0709
See application file for complete search history.

(56) References Cited

U.S. PATENT DOCUMENTS

| | | | | |
|---|---|---|---|---|
| 8,478,726 | B2* | 7/2013 | Habermann | G06F 11/1464 707/640 |
| 10,025,673 | B1* | 7/2018 | Maccanti | G06F 11/1458 707/679 |
| 2005/0015663 | A1* | 1/2005 | Armangau | H04L 67/1095 714/15 |
| 2012/0150815 | A1* | 6/2012 | Pafumi | G06F 11/1658 707/679 |
| 2013/0238554 | A1* | 9/2013 | Yucel | G06F 17/30289 707/610 |
| 2013/0290249 | A1* | 10/2013 | Merriman | G06F 16/273 707/610 |

* cited by examiner

*Primary Examiner* — Yuk Ting Choi
(74) *Attorney, Agent, or Firm* — Dergosits & Noah LLP; Todd A. Noah

(57) ABSTRACT

Federated restore of availability group database replicas is described. A system receives a restore request associated with an availability group, and identifies a primary node in a cluster of nodes, the primary node storing a primary database replica associated with the availability group. The system identifies a secondary node in the cluster of nodes, the secondary node storing a secondary database replica associated with the availability group. The system removes the primary database replica and the secondary database replica from the availability group. The system simultaneously restores a backup database replica, associated with the availability group, as the primary database replica in the primary node and the secondary database replica in the secondary node. The system adds the restored primary database replica and the restored secondary database replica to the availability group.

16 Claims, 3 Drawing Sheets

FEDERATED RESTORE OF AVAILABILITY GROUP DATABASE REPLICAS

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

Some computer systems, such as Microsoft's SQL Server 2012, include an "Always On" availability group, which can be a high-availability and disaster-recovery solution that provides an enterprise-level alternative to database mirroring. An availability group can maximize the availability of a set of user databases for an enterprise, and support a failover environment for a discrete set of user databases, known as availability databases, that fail over together from one computer, or node, in a cluster to another computer, or node, in the cluster. An availability group can support a set of read-write primary replicas of a database and other sets of corresponding secondary replicas of the database. Secondary replicas may be made available for read-only access and/or some backup operations. Backup performance can improve if a system administrator specifies availability group properties, such as backup preference among primary replicas and secondary replicas for running backup jobs.

DETAILED DESCRIPTION

Figure 1:
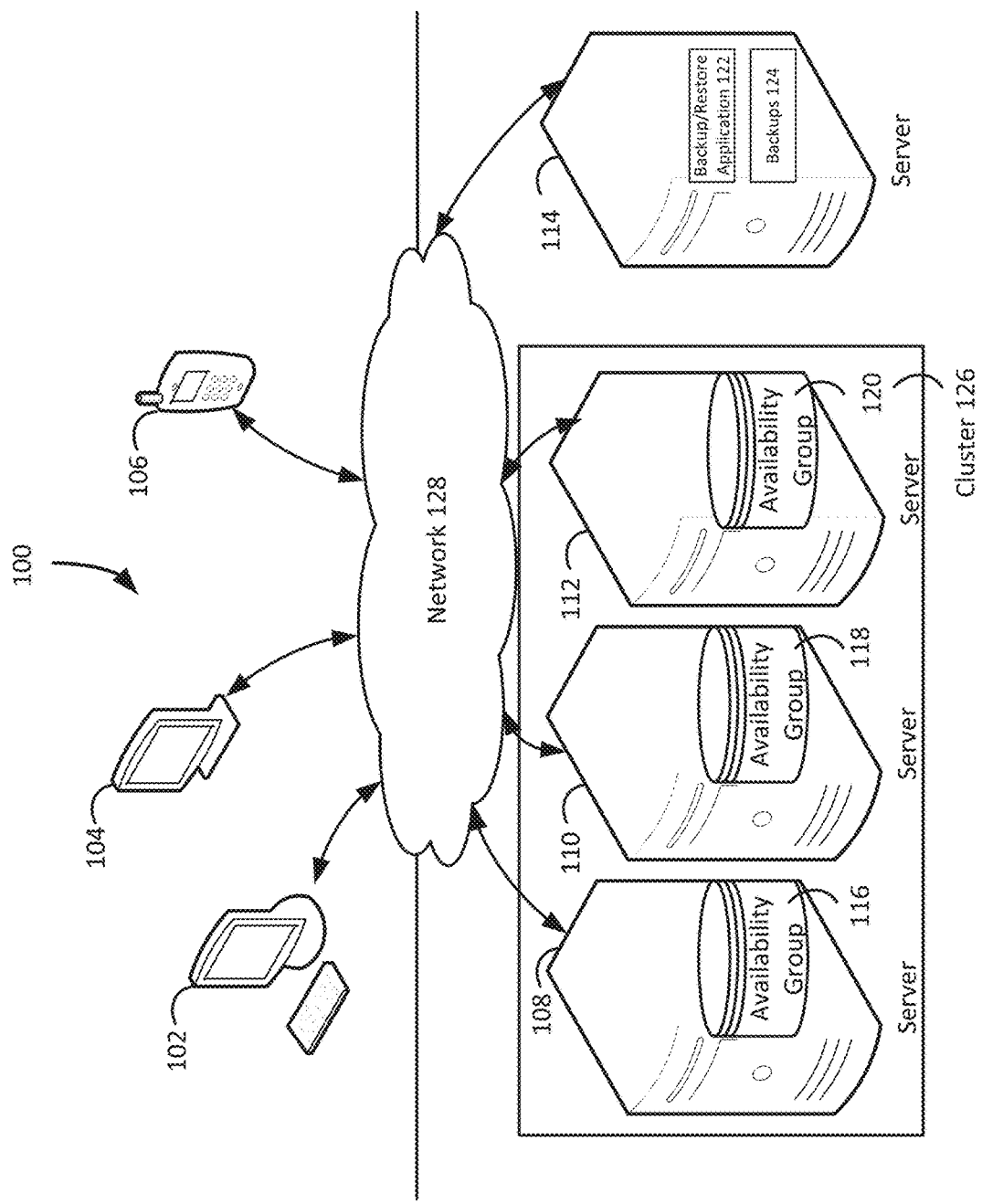
FIG. 1 illustrates a block diagram of an example system for federated restore of availability group database replicas, under an embodiment.

If a data protection administrator instructs a backup/restore application to execute a restore operation to restore a copy of the corresponding backup files for a specified state to a database replica in an availability group, the backup/restore application would begin to restore a database replica to an instance of the availability group in one node. However, this restore operation would temporarily break the replication applied to each of the instances of the availability groups distributed across various nodes, such that data saved to another instance during the restore process is lost when the other instance is subsequently overwritten during the restore process.

Consequently, the data protection administrator needs to first identify the primary node that stores the primary database replica, which is the only instance of the availability group to which end users can make changes, and remove the primary database replica from the availability group, thereby preventing end users from making changes to the primary database replica until the restore operation is completed. However, between the time that the data protection administrator's computer displays the identities of the availability group's primary node and primary database replica via a user interface, and the time when the data protection administrator's command to remove the primary database replica from the availability group reaches the availability group, the rapidly shifting availability group may detect a failure in the primary node and change the primary node to another node in the cluster. In this situation, the data protection administrator's command to remove the primary database replica from the availability group no longer applies to the primary database replica, such that the command removes what is now a secondary database replica from the availability group while end users continue to save data to the new primary database replica during the restore process, and this newly saved data is lost when the new primary database replica is subsequently overwritten during the restore process.

Even if the availability group does not change the primary node that stores the primary replica after the data protection administrator identifies the primary node that stores the primary database replica, the time that the data protection administrator requires to restore the database replicas to each node in the cluster is time that end users cannot access the database replicas, and this time of no end user access may become quite extended as the data protection administrator sequentially restores each node in a cluster with a significantly large number of nodes. This extended time of no end user access may result in lowering end user satisfaction.

Embodiments herein provide federated restore of availability group database replicas. A system receives a restore request associated with an availability group, and identifies a primary node in a cluster of nodes, the primary node storing a primary database replica associated with the availability group. The system identifies a secondary node in the cluster of nodes, the secondary node storing a secondary database replica associated with the availability group. The system removes the primary database replica and the secondary database replica from the availability group. The system simultaneously restores a backup database replica, associated with the availability group, as the primary database replica in the primary node and the secondary database replica in the secondary node. The system adds the restored primary database replica and the restored secondary database replica to the availability group.

For example, a backup/restore application receives a request from a database administrator to restore an availability group, and sends the request to the availability group's listener. The availability group listener identifies the cluster's primary node that stores the availability group's primary database replica, and sends the request to the primary node. The primary node identifies the cluster's secondary node that stores the availability group's secondary database replica, and sends the request to the secondary node. In response to receiving the request, the primary node removes the primary database replica from the availability group and instructs the secondary node to remove the secondary database from the availability group. In response to receiving the request, the primary node restores the backup of the availability group database to the primary node while the secondary node simultaneously restores the backup of the availability group database to the secondary node. In response to receiving the request, the primary node adds the restored primary database replica to the availability group and instructs the secondary node to add the restored secondary database to the availability group, thereby returning the availability group to fully functional operation with properly restored database replicas. Since the availability group listener immediately sends the restore request to the node that the availability group listener identifies as the primary node, the time lag during which the primary node can change to another node is eliminated. If the primary node changes after the availability group listener sent the restore request to the node that had been the primary node, the availability group listener immediately sends the restore request to the new primary node. By simultaneously restoring the backup of the availability group database to multiple nodes, the restoration time when end users cannot access database replicas may be significantly reduced, thereby increasing end user satisfaction.

FIG. 1 illustrates a block diagram of a system that implements federated restore of availability group database replicas, under an embodiment. As shown in FIG. 1, system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a first server 108, a second server 110, a third server 112, and a fourth server 114 that may be provided by a hosting company. The first server 108 includes a primary availability group 116, the second server 110 includes a secondary availability group 118, the third server 112 includes a secondary availability group 120, and the fourth server 114 includes a backup/restore application 122 and backups 124. Although FIG. 1 depicts the backups 124 residing on the fourth server 114, the backups 124 may be stored elsewhere, such as on another server or on a storage array, which are not depicted in FIG. 1. The servers 108-112 comprise a cluster 126, which does not include the fourth server 114. Therefore, the servers 108-112 may be referred to as the nodes 108-112 in the cluster 126. The clients 102-106 and the servers 108-114 communicate via a network 128.

Although FIG. 1 depicts the system 100 with three clients 102-106, four servers 108-114, three availability group instances 116-120, one backup/restore application 122, one set of backups 124, one cluster 126, and one network 128, the system 100 may include any number of clients 102-106, any number of servers 108-114, any number of availability group instances 116-120, any number of backup/restore applications 122, any number of sets of backups 124, any number of clusters 126, and any number of networks 128. The clients 102-106 and the servers 108-114 may each be substantially similar to the system 300 depicted in FIG. 2 and described below in reference to FIG. 3. FIG. 1 depicts the backup/restore application 122 residing completely on the fourth server 114, but the backup/application 122 may reside completely on any of the servers 108-112, completely on any of the clients 102-106, completely on another server that is not depicted in FIG. 1, or in any combination of partially on the servers 108-114, partially on the clients 102-106, and partially on the other server. The backup/restore application 122 may provide a plug-in to any of the clients 102-106 and/or any of the servers 108-114 that enables any of the clients 102-106 and/or any of the servers 108-114 to execute the commands to back up and restore a database replica. Even though the following paragraphs describe EMC Corporation's Avamar® backup/restore application and EMC Corporation's NetWorker® backup/restore application as examples of the backup/restore application 122, the backup/restore application 122 may be any other backup/restore application which provides the backup/restore functionalities described in the Background section.

The backup/restore application 122 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 122 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. Although the functionality examples described in this paragraph apply to EMC Corporation's NetWorker® backup/restore application, one of skill in the art would recognize that other backup/restore applications and their corresponding functionalities may be used. The backup/restore application 122 may also be implemented as a NetWorker® Module For Microsoft Applications, which, as stated above, may reside completely on any of the servers 108-114, completely on any of the clients 102-106, completely on another server that is not depicted in FIG. 1, or in any combination of partially on the servers 108-114, partially on the clients 102-106, and partially on the other server.

An availability group can be a read/write database and at least one read-only database, such that a read-only database becomes the read/write database when the original read/write database is no longer sufficiently accessible. A node can be a computer that manages access to a centralized resource in a network. A cluster of nodes can be a group of computers that manage access to a centralized resource in a network. A database replica can be a copy of a structured set of information held in a computer, especially one that is accessible in various ways. A primary node can be a computer that manages read/write access to a copy of a structured set of information for an availability group. A secondary node can be a computer that manages read-only access to a copy of a structured set of information for an availability group. A primary database replica can be a read/write accessible copy of a structured set of information for an availability group. A secondary database replica can be a read-only accessible copy of a structured set of information for an availability group. A backup, or a backup database replica, can be an extra copy of a structured set of information in case the original is lost or damaged. A restore request can be the act of asking formally for a structured set of information to be returned to a former condition. A listener can be a centralized resource for a cluster, which receives and forwards requests such as restore requests.

References in this disclosure to a primary database replica may refer to multiple primary database replicas that correspond to multiple secondary database replicas stored by the secondary nodes. For an example of one primary database replica in an availability group, the primary database replica X is in the primary availability group 116, and the secondary database replicas X are in each of the secondary availability groups 118-120. For an example of multiple primary database replicas in an availability group, the primary database replicas X and Y are in the primary availability group 116, and the secondary database replicas X and Y are in each of the secondary availability groups 118-120.

When the system 100 receives a restore request associated with an availability group, the system 100 identifies a primary node in a cluster of nodes, the primary node storing a primary database replica associated with the availability group. For example, upon receiving a request to restore an availability group, the backup/restore application 122 identifies the node 108 as the primary node that stores the availability group's primary database replica. Identifying the primary node may include sending a restore request to a listener associated with an availability group, the listener identifying the primary node, and the listener sending the restore request to the primary node. For example, the backup/restore application 122 receives a request from the client 102 of a database administrator to restore an availability group, and sends the restore request to the availability group's listener. The availability group listener identifies the cluster's primary node 108 that stores the availability group's primary database replica, and sends the request to the primary node 108. Then the system 100 continues identifying nodes by identifying a secondary node in the cluster of nodes, the secondary node storing a secondary database replica associated with the availability group. For example, after identifying the cluster's primary node 108 that stores the availability group's primary database replica, the backup/restore application 122 identifies the secondary node 110-112 that store the availability group's secondary database replicas. Identifying a secondary node may include the primary node sending a restore request to the secondary node. For example, the primary node 108 identifies the cluster's secondary nodes 110-112 that store the availability group's secondary database replicas, and sends the request to the secondary node 110-112.

Following the identification of each cluster node that stores an availability group database replica, the system 100 removes the primary database replica and a secondary database replica from the availability group. For example, the system 100 removes the primary database replica stored by the primary node 108 and the secondary database replicas stored by the secondary node 110-112 from the availability group. Removing the primary database replica stored by the primary node and each secondary database replica stored by each secondary node from an availability group may include the primary node removing the primary database replica from the availability group and instructing each secondary node to remove their secondary database replica from the availability group. For example, the primary node 108 removes the primary database replica from the availability group and instructs the secondary nodes 110-112 to remove their secondary database replicas from the availability group.

Once the database replicas are removed from the availability group, the system 100 simultaneously restores a backup database replica, associated with the availability group, as the primary database replica in the primary node and the secondary database replica in the secondary node. For example, the system 100 simultaneously restores a backup of the availability group's database replica to the primary node 108 and the secondary nodes 110-112. Simultaneously restoring a backup database replica to the primary node and each secondary node may include the primary node restoring the backup database replica as the primary database replica in the primary node while each secondary node restores the backup database replica as each secondary database replica in each secondary node. For example, the primary node 108 restores the backup of the availability group's database replica as the primary database replica in the primary node 108 while the secondary nodes 110-112 simultaneously restore the backup of the availability group's database replica as the secondary database replicas in the secondary nodes 110-112.

Having restored the database replicas, the system 100 adds the restored primary database replica and the restored secondary database replica to the availability group. For example, the system 100 adds the primary database replica restored to the primary node 108 and the secondary database replicas restored to the secondary nodes 110-112 to the availability group. Adding a restored primary database replica and each restored secondary database replica to an availability group may include the primary node adding the restored primary database replica to the availability group and instructing the secondary node to add the restored secondary database replica to the availability group. For example, the primary node 108 adds the restored primary database replica to the availability group and instructs the secondary nodes 110-112 to add the restored secondary database replicas to the availability group, thereby returning the availability group to fully functional operation with properly restored database replicas.

Since the availability group listener immediately sends the restore request to the node that the availability group listener identifies as the primary node, the time lag during which the primary node can change to another node is eliminated. If the primary node changes after the availability group listener sent the restore request to the node that had been the primary node, the availability group listener immediately sends the restore request to the new primary node. By simultaneously restoring the availability group database replica to multiple nodes, the restoration time when end users cannot access database replicas may be significantly reduced, thereby increasing end user satisfaction.

Figure 2:
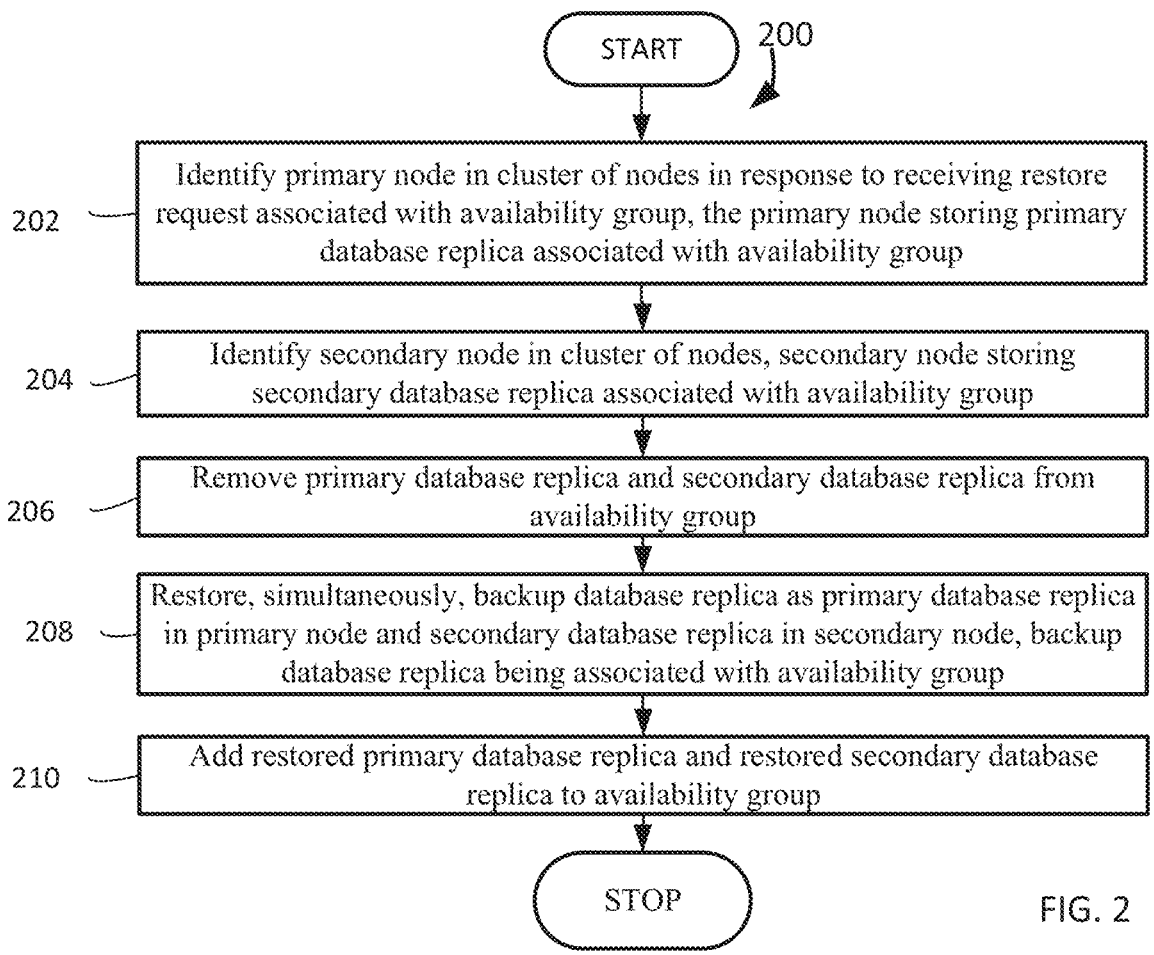
FIG. 2 is a flowchart that illustrates a method for federated restore of availability group database replicas, under an embodiment.

FIG. 2 is a flowchart that illustrates a method for federated restore of availability group database replicas, under an embodiment. Flowchart 200 illustrates method acts illustrated as flowchart blocks for certain steps involved in and/or between the clients 102-106 and/or the servers 108-114 of FIG. 1.

A restore request associated with an availability group is received, and a primary node is identified in a cluster of nodes, the primary node storing a primary database replica associated with the availability group, block 202. The system 100 begins identifying the nodes that will have their database replicas restored. For example and without limitation, this can include the backup/restore application 122 receiving a request from the client 102 of a database administrator to restore an availability group, and sending the request to the availability group's listener. The availability group listener identifies the cluster's primary node 108 that stores the availability group's primary database replica, and sends the request to the primary node 108.

Having identified a primary node that stores an availability group's primary database replica, a secondary node is identified in the cluster of nodes, the secondary node storing a secondary database replica associated with the availability group, block 204. The system 100 concludes identifying the nodes that will have their database replicas restored. By way of example and without limitation, this can include the primary node 108 identifying the cluster's secondary nodes 110-112 that store the availability group's secondary database replicas, and sending the request to the secondary node 110-112.

After identifying the nodes that store availability group databases, the primary database replica and the secondary database replica are removed from the availability group, block 206. The system 100 removes the database replicas, which will be restored, from the availability group. In embodiments, this can include primary node 108 removing the primary database replica from the availability group and instructing the secondary nodes 110-112 to remove the secondary database replicas from the availability group.

Following the removal of databases from the availability group, a backup database replica, associated with availability group, is simultaneously restored as the primary database replica in the primary node and the secondary database replica in the secondary node, block 208. The system 100 simultaneously restores the database replicas. For example and without limitation, this can include the primary node 108 restoring the backup of the availability group's database replica to the primary node 108 while the secondary nodes 110-112 simultaneously restore the backup of the availability group's database replica to the secondary nodes 110-112.

Once the database replicas are restored, the restored primary database replica and the restored secondary database replica are added to the availability group, block 210. The system 100 adds the database replicas that have been restored back to the availability group. By way of example and without limitation, this can include the primary node 108 adding the restored primary database replica to the availability group and instructing the secondary nodes 110-112 to add the restored secondary database replicas to the availability group.

Although FIG. 2 depicts the blocks 202-210 occurring in a specific order, the blocks 202-210 may occur in another order. In other implementations, each of the blocks 202-210 may also be executed in combination with other blocks and/or some blocks may be divided into a different set of blocks.

Figure 3:
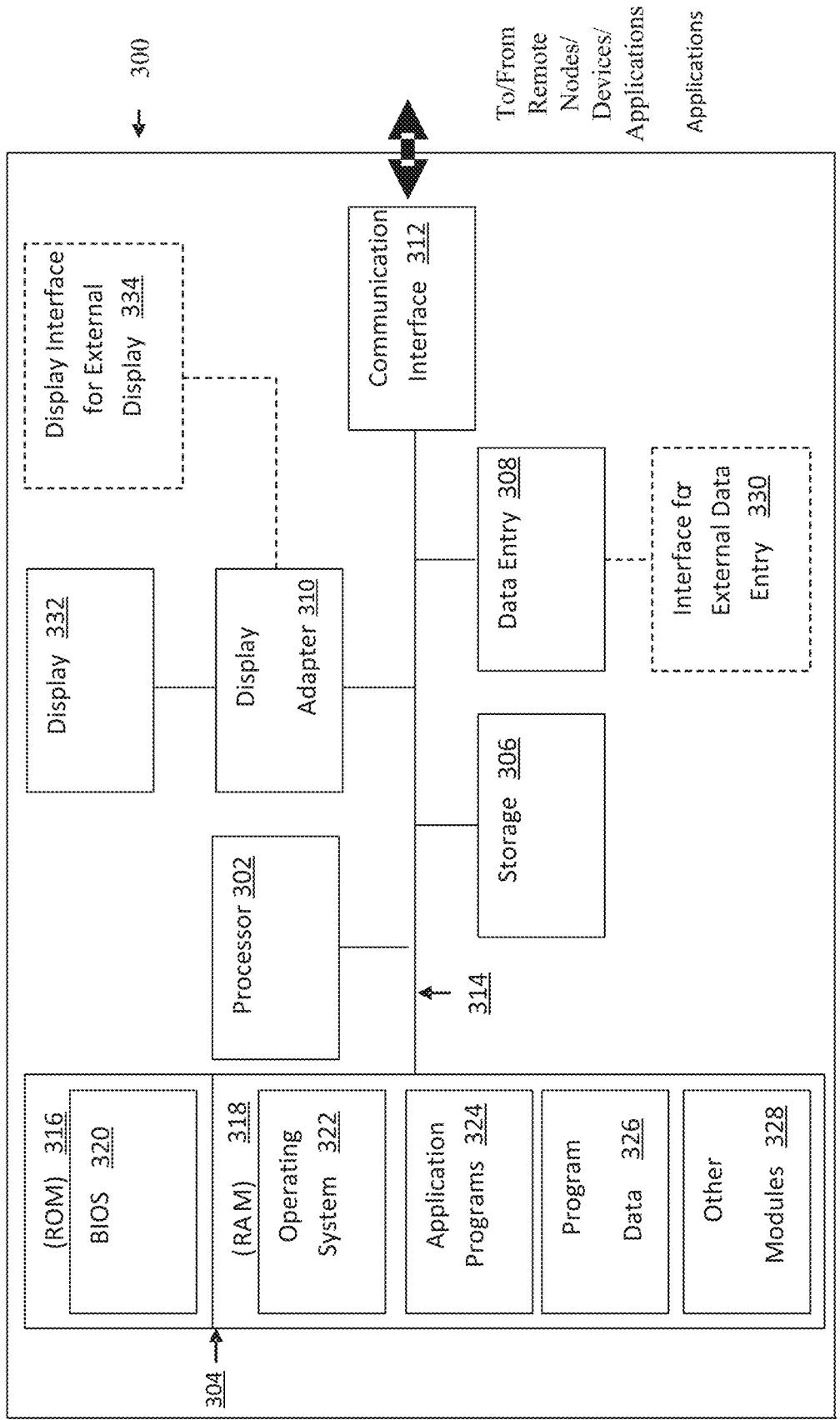
FIG. 3 is a block diagram illustrating an example hardware device in which the subject matter may be implemented.

Having describes the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, data entry module 308, display adapter 310, communication interface 312, and a bus 314 that couples elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in memory 304 and/or storage 306 and/or received via data entry module 308.

The memory 304 may include read only memory (ROM) 316 and random access memory (RAM) 318. Memory 304 may be configured to store program instructions and data during operation of device 300. In various embodiments, memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 304 may also include nonvolatile memory technologies such as nonvolatile flash RAM (NVRAM) or ROM. In some embodiments, it is contemplated that memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, ROM 316 or RAM 318, including an operating system 322, one or more applications programs 324, program data 326, and other program modules 328. A user may enter commands and information into the hardware device 300 through data entry module 308. Data entry module 308 may include mechanisms such as a keyboard, a touch screen, a pointing device, etc. Other external input devices (not shown) are connected to the hardware device 300 via external data entry interface 330. By way of example and not limitation, external input devices may include a microphone, joystick, game pad, satellite dish, scanner, or the like. In some embodiments, external input devices may include video or audio input devices such as a video camera, a still camera, etc. Data entry module 308 may be configured to receive input from one or more users of device 300 and to deliver such input to processing unit 302 and/or memory 304 via bus 314.

A display 332 is also connected to the bus 314 via display adapter 310. Display 332 may be configured to display output of device 300 to one or more users. In some embodiments, a given device such as a touch screen, for example, may function as both data entry module 308 and display 332. External display devices may also be connected to the bus 314 via external display interface 334. Other peripheral output devices, not shown, such as speakers and printers, may be connected to the hardware device 300.

The hardware device 300 may operate in a networked environment using logical connections to one or more remote nodes (not shown) via communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 312 may include logic configured to support direct memory access (DMA) transfers between memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the preceding description, the subject matter was described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the preceding context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for federated restore of availability group database replicas, the system comprising:
   one or more processors; and
   a non-transitory computer readable medium storing a plurality of instructions, which when executed cause the one or more processors to:
   identify a primary node in a cluster of nodes in response to receiving a restore request, the primary node storing a primary database replica associated with the availability group, the primary database replica being the only read/write database of the availability group, the restore request being a request to restore all database replicas of the availability group;
   identify a secondary node in the cluster of nodes, the secondary node storing a secondary read-only database replica based on the primary database replica;
   remove the primary database replica and the secondary database replica from the availability group, the removing preventing data from being written to the primary database replica and the secondary database replica during restoration of the database replicas;
   restore, as the primary database replica in the primary node, a read/write accessible backup database replica of the same database as the removed primary database replica, and while the primary node is being restored, restore as the secondary database replica in the secondary node, a read-only accessible backup database replica of the same database, the backup database replica being associated with the availability group; and
   add the restored primary database replica and the restored secondary database replica to the availability group.

2. The system of claim 1, wherein identifying the primary node comprises:
   sending the restore request to a listener associated with the availability group;
   the listener identifying the primary node;
   the listener sending the restore request to the primary node; and
   wherein identifying the secondary node comprises the primary node sending the restore request to the secondary node.

3. The system of claim 1, wherein the primary database replica comprises a plurality of primary database replicas that correspond to a plurality of secondary database replicas stored by the secondary node.

4. The system of claim 1, wherein removing the primary database replica and the secondary database replica from the availability group comprises the primary node removing the primary database replica from the availability group and instructing the secondary node to remove the secondary database replica from the availability group.

5. The system of claim 1, wherein adding the restored primary database replica and the restored secondary database replica to the availability group comprises the primary node adding the restored primary database replica to the availability group and instructing the secondary node to add the restored secondary database replica to the availability group.

6. A computer-implemented method for federated restore of availability group database replicas, the method comprising:
   identifying a primary node in a cluster of nodes in response to receiving a restore request, the primary node storing a primary database replica associated with the availability group, the primary database replica being the only read/write database of the availability group, the restore request being a request to restore all database replicas of the availability group;
   identifying a secondary node in the cluster of nodes, the secondary node storing a secondary read-only database replica based on the primary database replica;
   removing the primary database replica and the secondary database replica from the availability group, the removing preventing data from being written to the primary database replica and the secondary database replica during restoration of the database replicas;
   restoring, as the primary database replica in the primary node, a read/write accessible backup database replica of the same database as the removed primary database replica, and while the primary node is being restored, restoring as the secondary database replica in the secondary node, a read-only accessible backup database replica of the same database, the backup database replica being associated with the availability group; and
   adding the restored primary database replica and the restored secondary database replica to the availability group.

7. The method of claim 6, wherein identifying the primary node comprises:
   sending the restore request to a listener associated with the availability group;
   the listener identifying the primary node; and
   the listener sending the restore request to the primary node.

8. The method of claim 6, wherein identifying the secondary node comprises the primary node sending the restore request to the secondary node, and the primary database replica comprises a plurality of primary database replicas that correspond to a plurality of secondary database replicas stored by the secondary node.

9. The method of claim 6, wherein removing the primary database replica and the secondary database replica from the availability group comprises the primary node removing the primary database replica from the availability group and instructing the secondary node to remove the secondary database replica from the availability group.

10. The method of claim 6, wherein adding the restored primary database replica and the restored secondary database replica to the availability group comprises the primary node adding the restored primary database replica to the availability group and instructing the secondary node to add the restored secondary database replica to the availability group.

11. A computer program product, comprising a non-transitory computer-readable medium having a computer-readable program code embodied therein to be executed by one or more processors, the program code including instructions to:

identify a primary node in a cluster of nodes in response to receiving a restore request, the primary node storing a primary database replica associated with the availability group, the primary database replica being the only read/write database of the availability group, the restore request being a request to restore all database replicas of the availability group;

identify a secondary node in the cluster of nodes, the secondary node storing a secondary read-only database replica based on the primary database replica;

remove the primary database replica and the secondary database replica from the availability group, the removing preventing data from being written to the primary database replica and the secondary database replica during restoration of the database replicas;

restore, as the primary database replica in the primary node, a read/write accessible backup database replica of the same database as the removed primary database replica, and while the primary node is being restored, restore as the secondary database replica in the secondary node, a read-only accessible backup database replica of the same database, the backup database replica being associated with the availability group; and add the restored primary database replica and the restored secondary database replica to the availability group.

12. The computer program product of claim 11, wherein identifying the primary node comprises:

sending the restore request to a listener associated with the availability group;

the listener identifying the primary node; and the listener sending the restore request to the primary node.

13. The computer program product of claim 11, wherein identifying the secondary node comprises the primary node sending the restore request to the secondary node.

14. The computer program product of claim 11, wherein the primary database replica comprises a plurality of primary database replicas that correspond to a plurality of secondary database replicas stored by the secondary node.

15. The computer program product of claim 11, wherein removing the primary database replica and the secondary database replica from the availability group comprises the primary node removing the primary database replica from the availability group and instructing the secondary node to remove the secondary database replica from the availability group.

16. The computer program product of claim 11, wherein adding the restored primary database replica and the restored secondary database replica to the availability group comprises the primary node adding the restored primary database replica to the availability group and instructing the secondary node to add the restored secondary database replica to the availability group.

* * * * *